Aug. 7, 1956     F. COPPA     2,757,692
WEAVING LOOMS

Filed Sept. 16, 1952     9 Sheets-Sheet 1

INVENTOR:
FERDINANDO COPPA
BY:

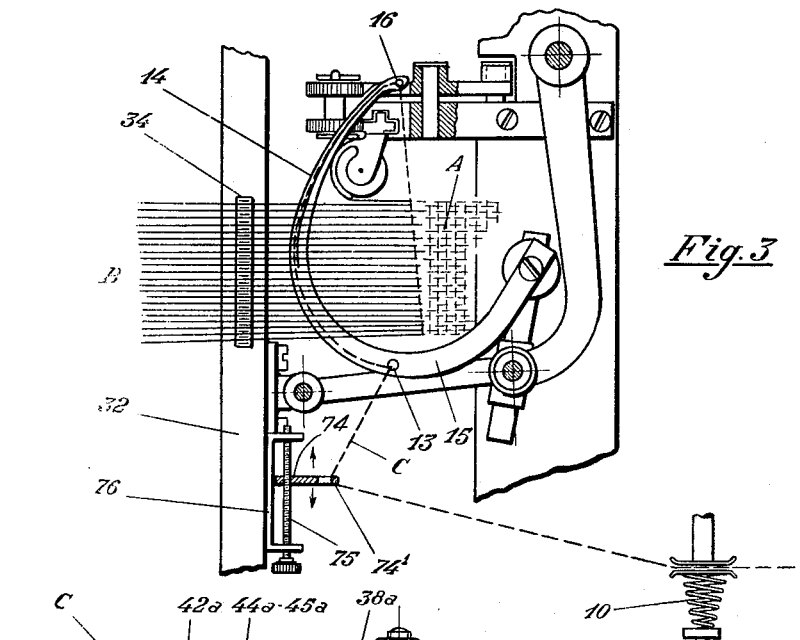
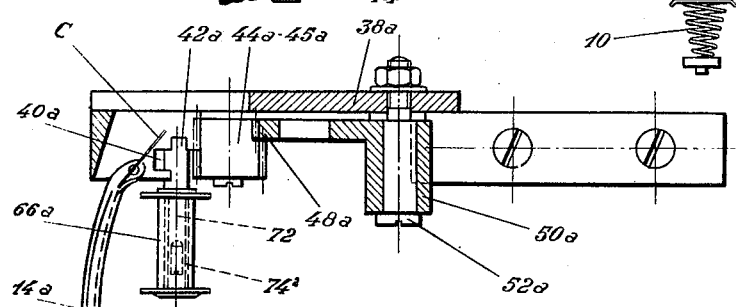
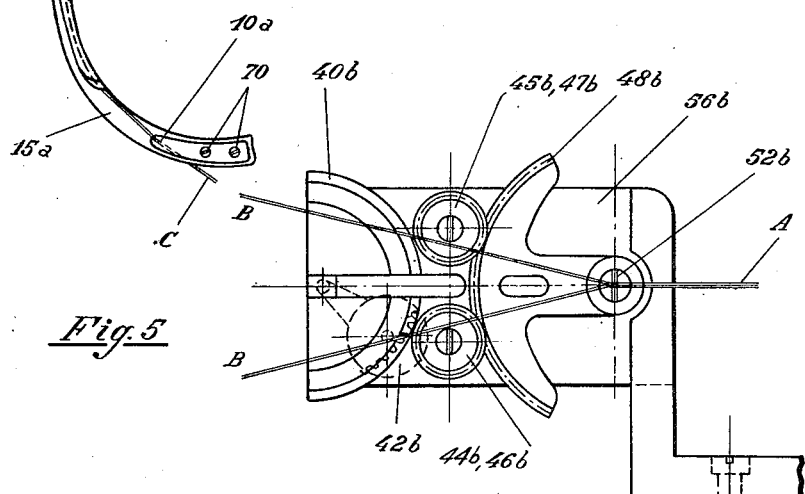

Aug. 7, 1956    F. COPPA    2,757,692
WEAVING LOOMS
Filed Sept. 16, 1952    9 Sheets-Sheet 3

INVENTOR:
FERDINANDO COPPA

Aug. 7, 1956  F. COPPA  2,757,692
WEAVING LOOMS
Filed Sept. 16, 1952  9 Sheets-Sheet 4

INVENTOR:
FERDINANDO COPPA
BY:

Aug. 7, 1956 F. COPPA 2,757,692
WEAVING LOOMS
Filed Sept. 16, 1952 9 Sheets-Sheet 5

INVENTOR:
FERDINANDO COPPA
BY:

Aug. 7, 1956    F. COPPA    2,757,692
WEAVING LOOMS
Filed Sept. 16, 1952    9 Sheets-Sheet 6
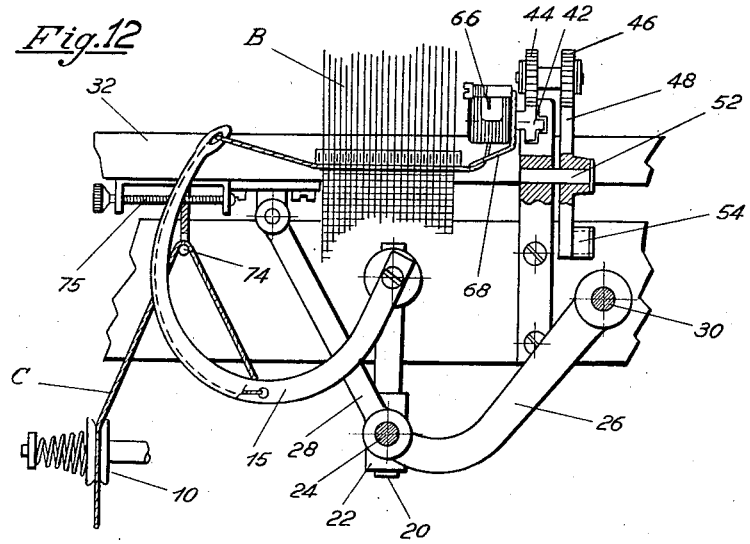
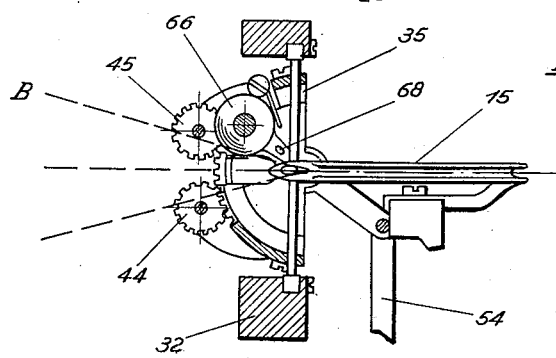
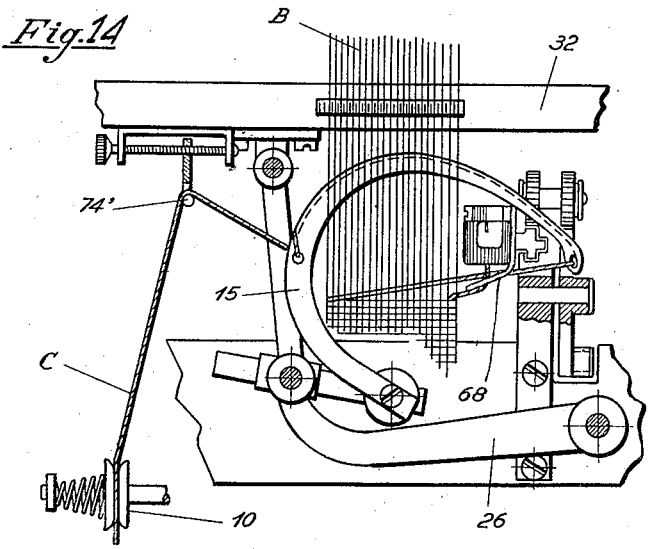
Inventor:
Ferdinando Coppa
by:
Michael S. Striker
agt.

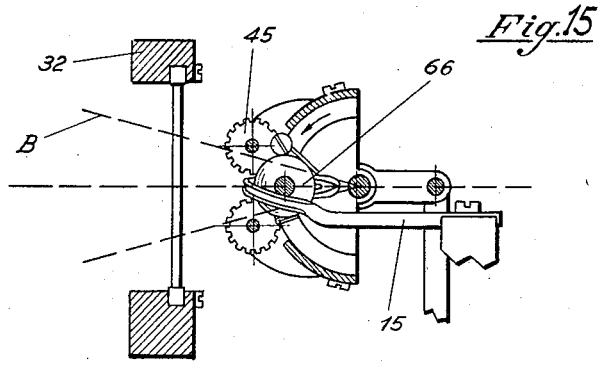
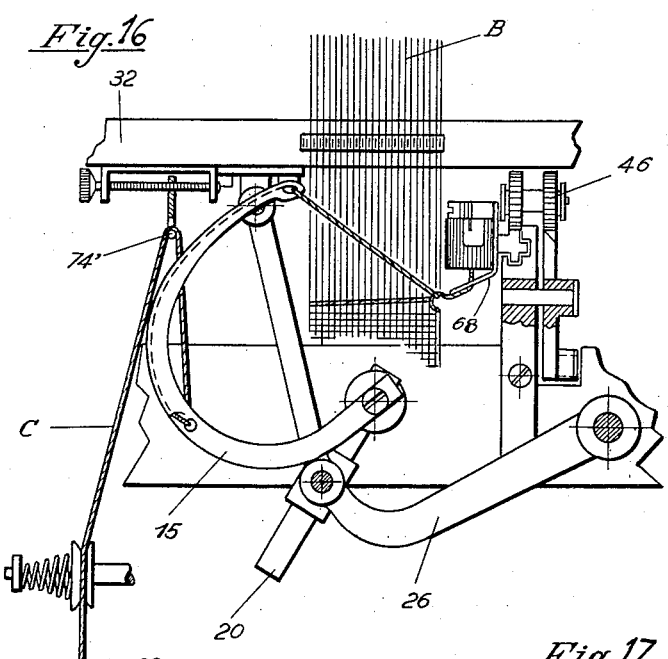
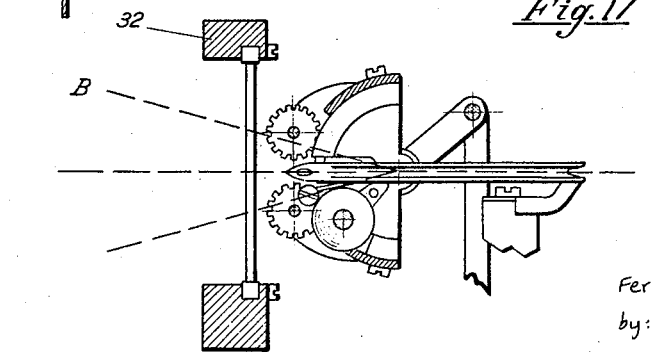

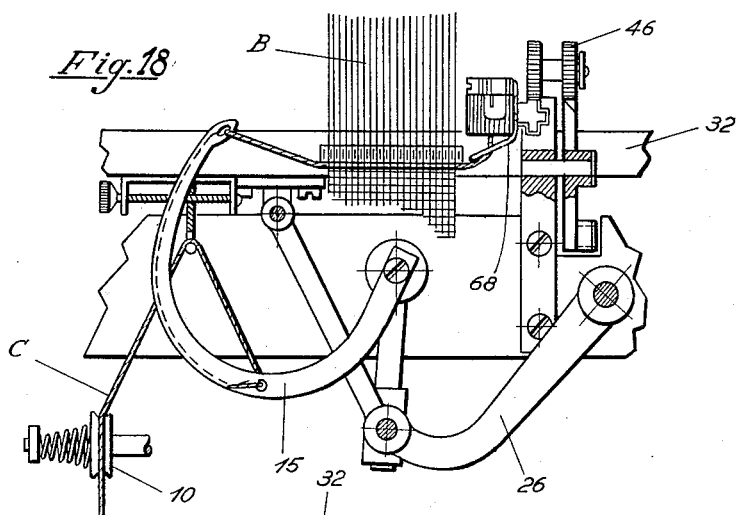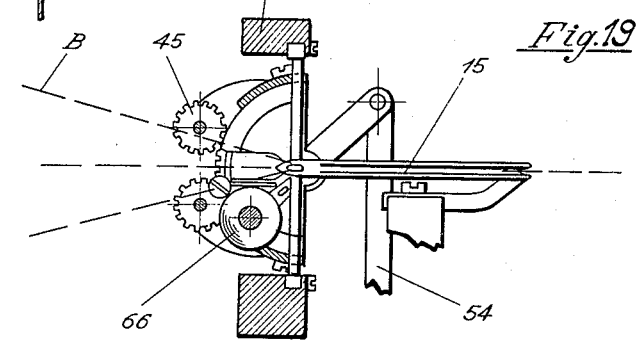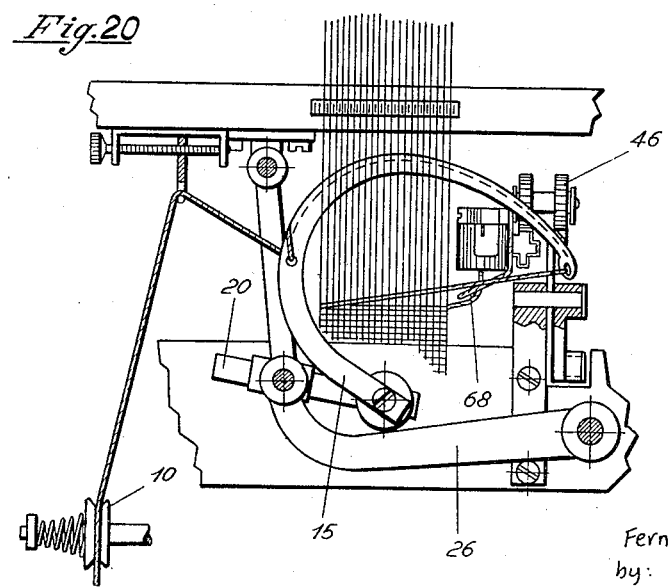

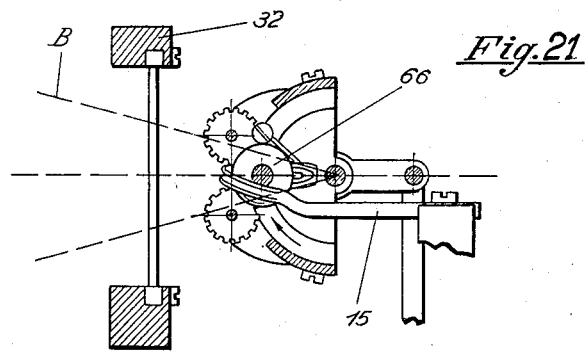
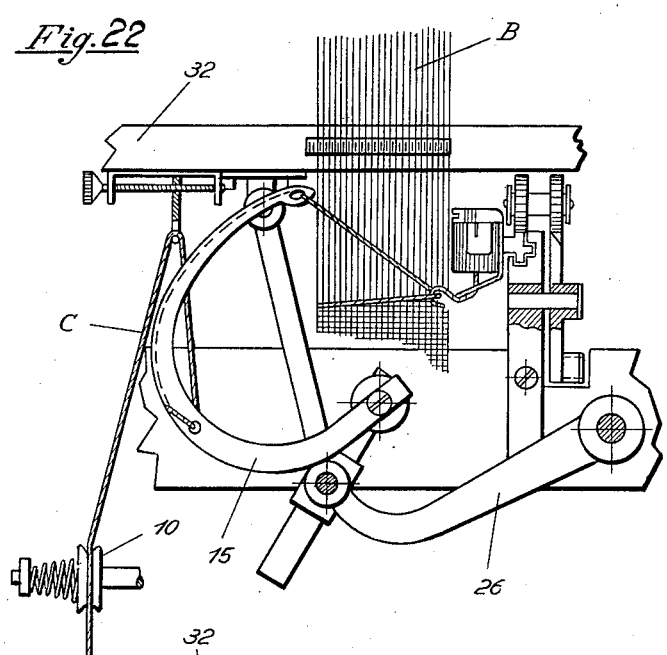
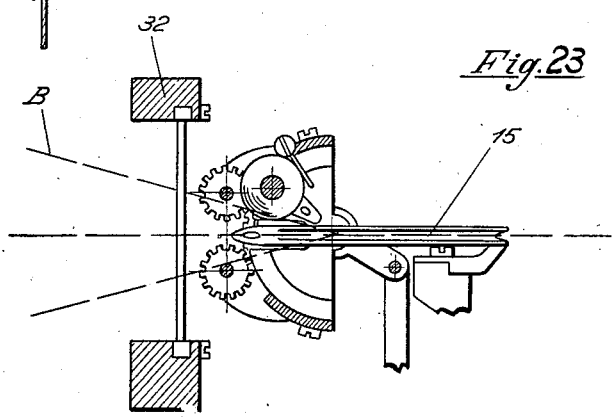

United States Patent Office 2,757,692
Patented Aug. 7, 1956

2,757,692
WEAVING LOOMS
Ferdinando Coppa, Milan, Italy

Application September 16, 1952, Serial No. 309,895

Claims priority, application Italy September 25, 1951

17 Claims. (Cl. 139—124)

The present invention relates to weaving looms, particularly for ribbons or the like, with stationary feed of the weft and with arrangement for the formation of an identical selvedge at the ends of the cloth or tissue.

Looms are already known, especially for weaving ribbons, which do not employ a shuttle for the weft, which weft is inserted into the shed through the medium of a reciprocating device.

The material produced, however, does not present identical selvedges and this is a disadvantage in the case of ribbons. Attempts have been made to obviate this disadvantage by providing two weft devices arranged laterally to the material, but even in this case there are other disadvantages caused by the slowness of operation of the weft devices, whilst the material produced is not well liked because the selvedges even though they may be identical and symmetrical are thickened in comparison with the rest of the material.

An object of the present invention is to eliminate these and other disadvantages, and to provide a shuttleless loom with which it is possible to produce a material equal to the normal material obtained with a loom employing a shuttle, in such a manner that the weft becomes intertwined alternately with the end threads of the warp, whilst allowing the loom to be used at increased speeds without causing weft breaking or other incidents.

With the above objects in view, the present invention mainly consists in a weaving apparatus including a loom and driving means therefor comprising, in combination, support means, weft inserting means mounted on the support means and arranged on one side of the warp for movement through the warp shed and across the warp and back for laying loops of weft thread in the shed, selvedge forming means mounted on the support means and arranged on the opposite side of the warp and operable to insert a selvedge thread through the weft loops formed by the weft inserting means along the warp for forming a selvedge along the woven material on the opposite side, sley means operable by the loom driving means to beat the weft inserted by the weft inserting means, connecting means connecting the sley means to the weft inserting means for operating the weft inserting means in synchronism with the movements of the sley means, and actuating means connected to the selvedge forming means and operable by the loom driving means for moving the selvedge forming means relative to the warp in a direction substantially normal to the direction of movement of the weft inserting means and in synchronism with the movements of the weft inserting means and the sley means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

In the drawings:

Fig. 1 diagrammatically illustrates, in horizontal section, one preferred embodiment of the loom.

Fig. 3 is a view analogous to Fig. 1 of a variant.

Fig. 4 is a horizontal section of another variation of the loom wherein the weft device comprises tensioning means for the weft.

Figs. 5 to 7 show in longitudinal section, some variations of embodiments of the loom in which the weft device has been omitted for the sake of clarity.

Fig. 12 is a partly sectioned top view similar to Fig. 1 but showing the loom members in a different weaving position;

Fig. 13 is a partly sectioned side view similar to Fig. 2 showing the members in the same weaving position as in Fig. 12;

Fig. 14 is a partly sectioned top view similar to Fig. 12 showing the loom members in a position following the position illustrated in Fig. 12;

Fig. 15 is a partly sectioned side view corresponding to Fig. 14;

Fig. 16 is a partly sectioned top view similar to Fig. 14 showing the loom members in a position following the position illustrated in Fig. 14;

Fig. 17 is a partly sectioned side view corresponding to Fig. 16;

Fig. 18 is a partly sectioned top view similar to Fig. 16 showing the loom members in a position following the position illustrated in Fig. 16;

Fig. 19 is a partly sectioned side view corresponding to Fig. 18;

Fig. 20 is a partly sectioned top view similar to Fig. 18 showing the loom members in a position following the position illustrated in Fig. 18;

Fig. 21 is a partly sectioned side view corresponding to Fig. 20;

Fig. 22 is a partly sectioned top view similar to Fig. 20 showing the loom members in a position following the position illustrated in Fig. 20; and Fig. 23 is a partly sectioned side view corresponding to Fig. 21.

Figure 1:
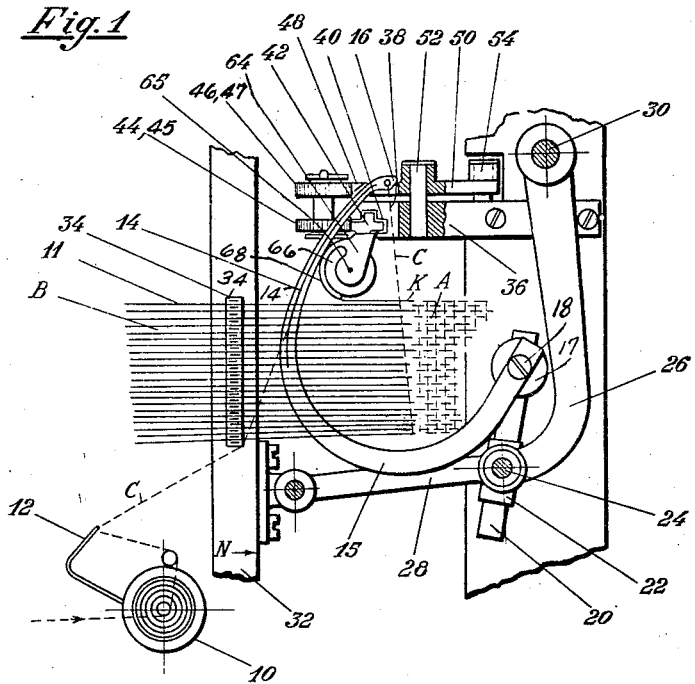
Figure 2:
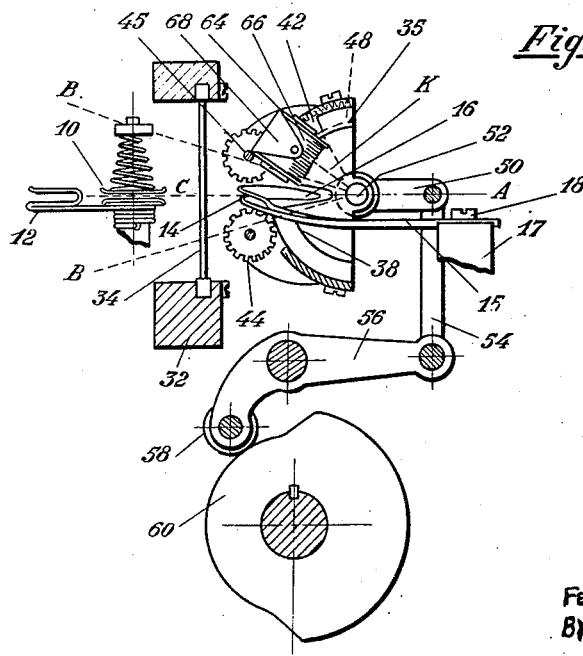
Fig. 2 is a longitudinal section.

Referring now to Figs. 1 and 2 the material is shown generally at A, the warp at B and the weft thread by C. The latter in known manner, proceeds from a bobbin or other device attached in a convenient position on the loom and passes firstly through an adjustable tensioning device, and then via a flexible thread-guide 12, to pass then into a guide channel 14 in a weft device 15 and finally through a guide eyelet hole 16 at the end of said weft device 15 to enter the shed.

The other end of device 15 is pivotally attached to a bush 17 threaded on a pivot 18 fixed to the loom frame. to the bush 17 is connected a side arm 20 on which a sleeve 22 is slidably arranged. The sleeve 22 comprises a pivot 24 to which are hingedly connected an arm 26 and a rod 28. The arm 26 is pivoted on a pin 30 fixed on the loom frame, whilst the rod 28 on the other hand is connected with a lay or sley 32 upon which is arranged a reed 34 for the heating-up of the weft. The lay 32 is operated in known manner, viz. by means of a connecting rod-crank arm device.

On the side of the warp threads opposite to the location of device 15, is arranged the selvedge forming means.

This means comprises a bracket 36 attached to the frame of the loom and terminating in a fork 38 between the arms of which the device 15 can pass.

The arms of the fork are provided with curved guides 40 in which moves a toothed segment 42 engaging with at least one of a pair of pinions 44 and 45 which are suitably arranged relative to one another so as to provide between them an opening coinciding with the opening of the fork 38 so that the device 15 may pass freely therethrough.

Each of the pinions 44, 45 is respectively integral with an identical pinion 46, 47 of equal characteristics. A toothed segment 48, having a lever 50 the fulcrum 52 of which is supported by a bracket 36 engages both the pinions 46, 47. The sets of pinions are suitably supported by the bracket 36.

The lever 50 is connected at its extremity by a connecting rod 54 which in its turn is connected to a lever 56 provided with a roller 58. The roller 58 works in conjunction with the periphery of a cam 60 which is driven from the driving motor of the loom in such manner that the motion obtained is in synchronism with the motion of the reed 34 and the device 15.

To the toothed segment 42 is affixed a stirrup 64 suitably shaped to carry a pivot 65 which holds a bobbin 66 upon which is wound an amount of reserve thread. This reserve thread constitutes the thread K for the selvedge remote from the device 15. The thread unwinding from the bobbin passes into a thread-guide 68 which is formed integrally with the stirrup 64.

The toothed segments 42 and 48 have equal radius but different amplitude. The segment 48 is of such amplitude that when it is in the extreme positions its teeth are always in engagement with both the pinions 46 and 47 so as to keep the engagement between these parts stable. On the other hand, the toothed segment 42 is of lesser amplitude than the segment 48 but is precisely of such amplitude that when its teeth are just about to leave one or other of the pinions 44 and 45 its other teeth are already in engagement with the other of the pinions 44 and 45 so that the displacement of the segment is effected continually and in synchronism with the movement of the segment 48.

In practice, the amplitude of this segment depends therefore on the distance between centres of the pinions 44 and 45, this being such as to allow the free passage of the device 15 through the space defined by the periphery of the pinions.

From the foregoing the manner of operation of the loom will be obvious.

The movements of the device 15, of the reed 34 and of the bobbin 66 are effected so that, when the device 15 is being inserted in the shed as shown in the Figures 1 and 3, the reed 34 is remote from the material A, whilst the bobbin 66 is found in the position of Fig. 1 or in the opposite position, that is, displaced downward by about 30 degrees respectively with regard to the position illustrated in Fig. 2. Either of these positions allows the free passage of the device 15 beyond the warp so as to form a loop through which pass successively the unit constituted by the bobbin 66, the stirrup 64 and the segment 42 to lock or intertwine the binding thread K with the weft thread. This movement of the aforesaid unit is effected through the medium of the cam 60, and during the time the device 15, having reached its extreme position shown in Fig. 2 is in the position to reverse its motion.

When the unit hereinbefore discussed has reached the position opposite to the one just considered, the device 15 is extracted. The intertwining of the weft thread C with the binding or locking thread K is such that it forms a selvedge which is equal to the opposite selvedge.

It is evident that the motion of the device 15 is a motion with a sinusoidal variation obtained by the mechanism formed by rod 28, arm 20 and counter-arm 26.

This alternative sinusoidal motion of the weft device results in the extraction of the weft device from the shed at a reduced speed, as compared with the speed at which the device is inserted. In this manner, as the weft device is extracted from the shed with a very reduced speed with respect to the speed with which it enters the same, the unit formed by bobbin 66, stirrup 64 and sector 42 can pass through the loop formed by the thread C, without danger of obstacles or breaking, even if the loom speed is high.

The operation of the loom is further clarified in the Figs. 12—23 which show consecutive positions of the various parts of the loom during a cycle of operation. In Figs. 12 and 13 the loom is shown at the beginning of its operation and at a point in which the sley 32 has beaten the weft.

Figs. 14 and 15 shows the next phase of the loom operation in which the weft inserting device is introduced into the warp shed, while the sley is moved away from the fabric.

Figs. 16 and 17 show the loom in a third phase in which the weft inserting device has again been withdrawn from the warp shed after placing the weft thread in the shed in position to be engaged by the selvedge thread.

Figs. 18 and 19 show the next phase of operation in which the sley 32 has performed the weft beating operation.

Figs. 20 and 21 show the insertion of the weft inserting device into the warp shed, and in this case the bobbin 66 begins to move upwardly in contrast to its movement downwardly as shown in Fig. 15.

Figs. 22 and 23 show the final step in the cycle of operation wherein the weft inserting device 15 is moved away out of the warp shed after having placed the weft in the shed.

Thereafter the cycle is repeated for the weaving of the material and simultaneous forming of the selvedge by the bobbin means 66.

Fig. 3, shows a modification of the device, and parts corresponding to Figs. 1 and 2 are marked with the same reference numbers. This variant allows to easily and quickly adjust the weft thread C.

For this purpose, a hole or the like 13 is provided at a suitable location of the weft device provided through which the weft thread B passes before it engages the groove 14. In this way the friction to which the thread is subjected is constant and independent from the position taken by the weft device.

The weft thread C coming from the bobbin (not shown) passes into an adjustable brake 10 and then through an eye $74^1$ of a plate 74 which is provided with a threaded hole with which engages a screw supported by a stirrup 76 fitted on the lay 32 of the loom.

It follows that by turning said screw 75 it is possible to vary the amount of weft thread C drawn from the bobbin (not shown) at each loom picking. In fact, when the eye 74 is lowered, the length of the thread drawn from the bobbin is greater than when said eye is at its upper position.

Therefore, it is possible to make selvedges having equal characteristics, whilst it is possible to utilize the synchronism of the lay 32 of the sley batten in order to obtain a nearly constant tension of the weft thread C and to adjust this tension by displacing, through the screw 75, the position of the eye $74^1$.

The device 15a shown in Fig. 4 is furnished with a guide channel 14a for the weft thread C. This thread is unwound from a bobbin (not shown) and is caused to pass through a space or groove formed between a flexible plate 10a and the body of the device 15a. The plate 10a is fixed to the latter by means of screws 70 and the space between plate 10a and device 15a can be adjusted to regulate the tensioning of the thread C. This tensioning device corresponds to the parts 10 illustrated in Figs. 1 and 2. In this modification, movement of the bobbin 66a to pass the binding thread through the loop of weft thread is effected in a manner analogous to that previously described, that is, by menas of a lever 50a which terminates in a toothed sector 48a which engages with a pair of pinions 44a and 46a, which in their turn engage with another toothed segment 42a is integral with a pivot 72, the axis of which is parallel to the axis of oscillation of the toothed segment. The pivot 72 is drilled along its axis and has longitudinal grooves which render it flexible. The flexibility of the pivot 72 is adjusted by means of a screw 74² inserted into the threaded bore of the pivot so as more or less to deform the flexible walls of this pivot. The latter engages in the orifice of the bobbin 66a so that the rotation thereof is more or less braked.

The loom illustrated in Fig. 5 serves particularly for weaving elastic goods. In such a loom the intertwining of the weft thread C with the warp thread K occurs in the position which is as remote as possible from the final beat-up position of the weft, which coincides as shown in Fig. 5 with the axis of oscillation of the toothed segment 48b that is with the axis of the pivot 52b.

The toothed segment 48b engages with the pinions 44b and 45b, each of which is integral respectively with counter-pinions 46b and 47b. The pinions and counter-pinions are suitably distanced from one another to allow the passage of the device 15 between them. The counter-pinions 46b and 47b engage with an analogous toothed segment 42b running in the curved guides 40b of a bracket 36b laterally fixed to the loom. To the toothed segment 42b is fixed the flexible pivot 72 mentioned in relation to Fig. 4. Thus displacement of the toothed segment 48 transmits movement through the pinions and counter-pinions 44b, 45b, 46b, 47b to the toothed segment 42b so that the bobbin 66b carried by the latter is caused alternatively to pass through the knot or loop formed from time to time by the weft thread K when the weft device (not shown) recedes.

Figure 6:
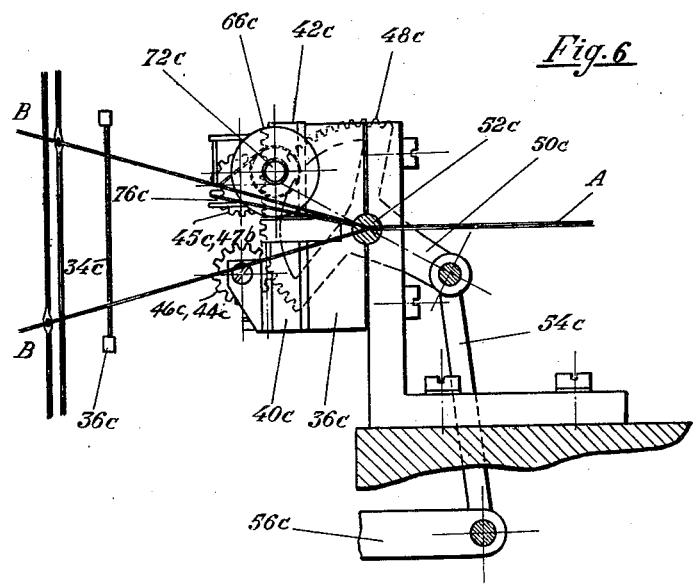

The modification according to Fig. 6 illustrates an arrangement for the rectilinear control of the bobbin 66c in a direction substantially orthogonal to the longitudinal axis of the material A. Such an arrangement comprises a lever 50c which through the linkage 54c and 56c receives movement from the driving shaft of the loom. A toothed segment 48c is integral with the lever 50c, which segment 48c engages at least in one of the pinions 44c and 45c. As before, these pinions 44c, 45c are suitably distanced one from the other to allow the passage therebetween of the weft device (not shown). With each of the pinions is integral a counter-pinion 46c, 47c, respectively. These latter in their turn engage with a rack 42c running in corresponding rectangular guides 40c formed in a bracket 36c fixed to the frame of the loom. Laterally to the rack 40c is attached a flexible pivot 72c, on which is mounted and elastically held the bobbin 66c for the binding thread K.

The manner of operation of this arrangement is similar to that of the preceding devices. When the segment 48c is oscillated, it turns the pairs of pinions 44c, 45c and counterpinions 46c, 47c, so that the bobbin 66c is moved to and fro, passing through the loop formed by the weft thread C as the weft device recedes at each oscillation.

The binding thread K unwinding from the bobbin 66c passes over a fluted groove 76c and is then introduced into the weft corresponding to one of the selvedges.

Figure 7:
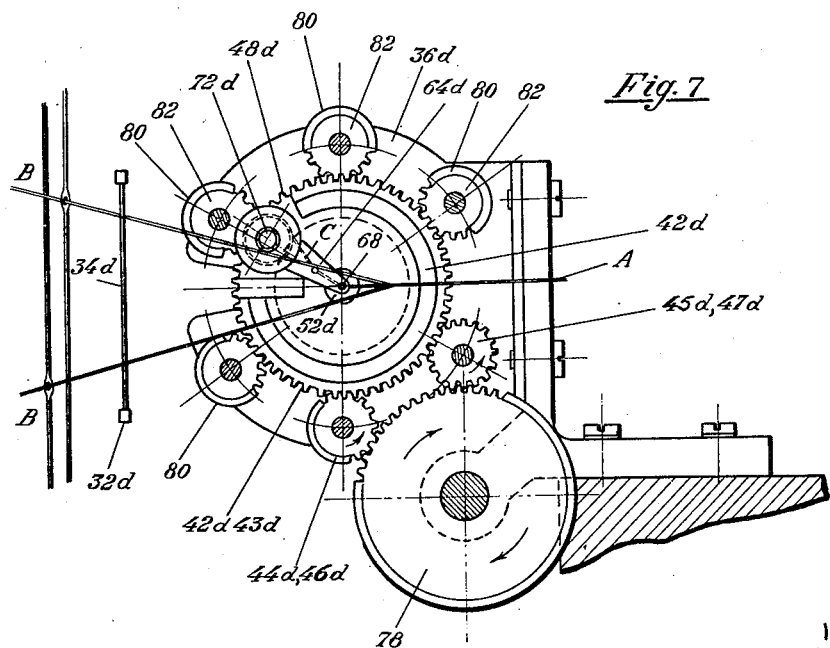

In the embodiment shown in Fig. 7 the weft binding device drives the bobbin for the thread with continuous rotary motion. For this purpose, the arrangement is furnished with a gear 78 driven through suitable transmissions (not shown) from the driving shaft of the loom. Such gearing 78 engages with a pair of pinions 44d, 45d, these in their turn engaging with gearing 48d. With this latter gearing also engage other pinions 80, having equal characteristics to those of the pinions 44d, 45d. Each of the pinions 44d, 45d and 80 is integral with a counter-pinion 46d, 47d and 82, respectively, which are equal to each other and the relative pinions. With the counter-pinions engages a toothed segment 42d fixed to a pivot 52d on the same axis as the gearing 48d mentioned hereinbefore and fixed to a bracket 36d. The segment 42d is suitably spaced from the gearing 48d to allow the free passage of the binding thread K, and it comprises a gearing of the same characteristics as the gearing hereinbefore discussed but provided with an angular opening of only slight amplitude with respect to the amplitude formed between two adjacent pinions 80 so as to allow the free passage of the weft device through this opening.

With the toothed segment 42d is integral a plate 64d arranged in a radial direction and provided near one end thereof with an elastic pivot 72d for holding the bobbin 66d for the binding thread K. The thread K, unwinding from this bobbin, passes through an orifice 68 in the plate 64d. The orifice 68 is co-axially arranged with the axis of rotation of the gearing 48d.

It will be evident that the rotation of the gearing 78 causes the rotation of the pair of pinions 44d and 45d and therefore also of the gearing 48d and pinions 80.

In analogous manner the counterpinions 46d, 47d and 82, are caused to rotate whereby the toothed segment 42d is caused to rotate continuously, and when one of the counterpinions is located in correspondence with the space wherein is arranged the bobbin 66d, the connection between the gearing 48d and the segment is always maintained by the remaining counterpinions.

As will be well understood, in the embodiments shown in Figs. 1 to 5, the control of the bobbin 66 with respect to the weft device 15 and the wefts of the loom may be effected in such a manner as to obtain the working together of the threads C of the weft and K, according to the material being produced. In such a case it is enough to exchange the cam 60 for another suitable one.

As may easily be understood, the control of the bobbin 66 with respect to the weft device 15 and therefore to the loom shaft may be effected in such a manner as to obtain the intertwining of the weft thread C with the warp thread K by every one or more pickings. In the latter case it suffices to replace the cam 60 with another suitable.

Figure 8:
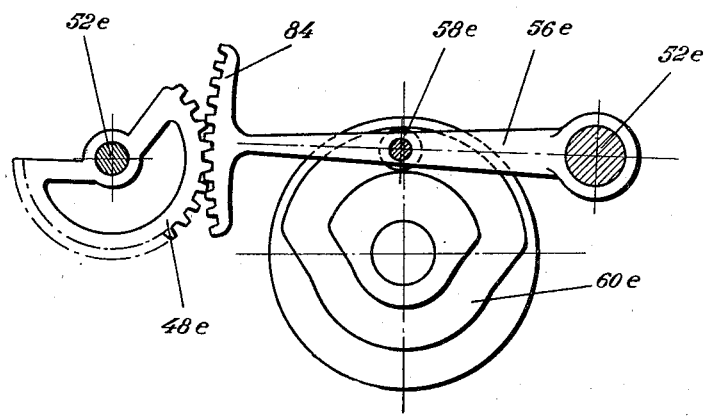
Figs. 8 to 11 show some variants of the mechanism for the control of the weft device.

In the modification according to Fig. 8, is illustrated another simplified solution for the control of the bobbin. The toothed sector 48e pivoted on the pin 52e engages a counter-sector 84 of a lever 56e carrying a roller 58e engaging a cam-like groove 60e cut in one face of a disc moved by the loom motion. The rotation of this disc causes oscillation of the sector 48e and therefore of the parts connected with this latter, as occurs in the case already described with reference to Figures 1 and 2.

Figure 9:
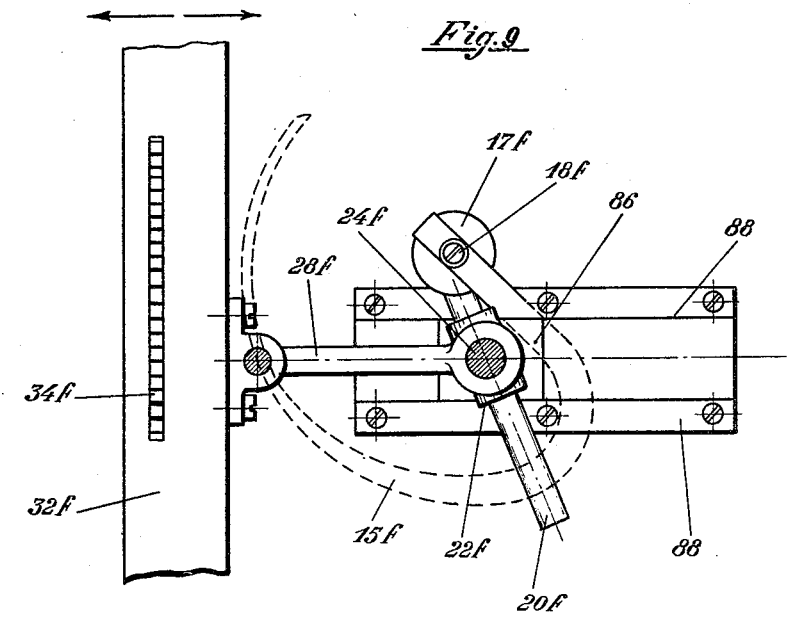
Figure 10:
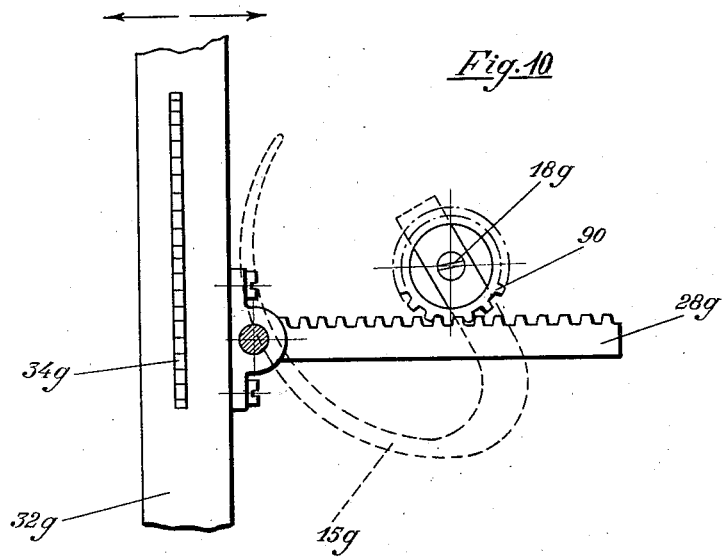
Figure 11:
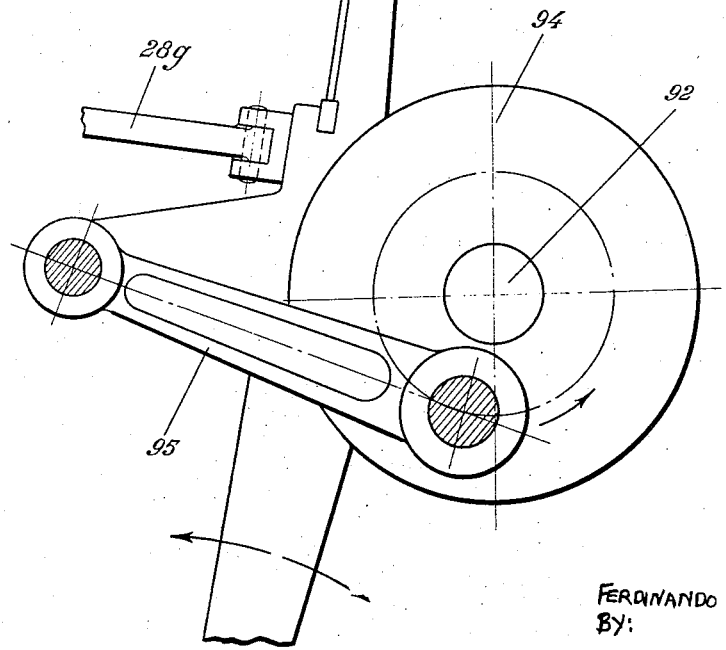

In the variations illustrated by Figures 9 to 11, there are shown some solutions concerning the control of the weft device 15, which derives said control from the movement of a sley box 32.

In Fig. 9, the weft device 15f is hingedly connected, through a bush 17f, to the pivot 18f, fitted on the loom frame. To said bush is also fitted an arm 20f on which slides a sleeve 22f carrying a pin 24f on which is mounted one end of a rod 28f, the other end of which is pivotally connected to the lay 32f. Opposite of pin 24f the sleeve 22f carries a small block 86 sliding in guide-ways 88 cut in the loom frame. The movement obtained with this mechanism is a motion with sinusoidal variation like that afore described.

In the variation according to Fig. 10, to the lay 32g of the sley box is hingedly connected a rack 28g which engages a respective pinion 90 integral with the weft device 15g. This pinion is fitted on a pivot 18g. In this case, the control of the lay 32g is made by the mechanism shown in Fig. 11. In this figure to the control shaft 92 of the loom is keyed a disc 94 to which is pivoted one end of a connecting rod 95 the other end of which is connected with the sley box, so as to operate this latter with the characteristics above mentioned.

Owing to the particular arrangement and dispositions of the various elements of the invention, it is possible to effect the operation of the loom at high speed, without any damage being done to the material produced.

Several looms constructed according to the present invention may be mounted on a common frame.

I claim:

1. In a weaving apparatus including a loom and driving means therefor, in combination, support means; weft inserting means mounted on said support means and arranged on one side of the warp for movement through the warp shed and across the warp and back for laying loops of weft thread in the shed; selvedge forming means mounted on said support means and arranged on the opposite side of the warp and operable to insert a selvedge thread through the weft loops formed by said weft inserting means along the warp for forming a selvedge along the woven material on said opposite side; sley means operable by the loom driving means to beat the weft inserted by said weft inserting means, connecting means connecting said sley means to said weft inserting means for operating said weft inserting means in synchronism with the movements of said sley means; and actuating means connected to said selvedge forming means and operable by the loom driving means for moving said selvedge forming means relative to the warp in a direction substantially normal to the direction of movement of said weft inserting means and in synchronism with the movements of said weft inserting means and said sley means.

2. In a weaving apparatus including a loom and driving means therefor, in combination, support means; weft inserting means mounted on said support means and arranged on one side of the warp for movement through the warp shed and across the warp and back for laying loops of weft thread in the shed; selvedge forming means mounted on said support means and arranged on the opposite side of the warp and operable to insert a selvedge thread through the weft loops formed by said weft inserting means along the warp for forming a selvedge along the woven material on said opposite side, said selvedge forming means comprising bobbin means for holding and feeding selvedge thread, said bobbin means being mounted on said support means for oscillation about an axis substantially parallel to the direction of movement of said weft inserting means between a position below the warp and a position above the warp for inserting the selvedge thread into the loops formed by said weft inserting means; sley means operable by the loom driving means to beat the weft inserted by said weft inserting means; connecting means connecting said sley means to said weft inserting means for operating said weft inserting means in synchronism with the movements of said sley means; and actuating means connected to said selvedge forming means and operable by the loom driving means for moving said selvedge forming means relative to the warp in a direction substantially normal to the direction of movement of said weft inserting means and in synchronism with the movements of said weft inserting means and said sley means.

3. In a weaving apparatus including a loom and driving means therefor, in combination, support means; weft inserting means mounted on said support means and arranged on one side of the warp for movement through the warp shed and across the warp and back for laying loops of weft thread in the shed; selvedge forming means mounted on said support means and arranged on the opposite side of the warp and operable to insert a selvedge thread through the weft loops formed by said weft inserting means along the warp for forming a selvedge along the woven material on said opposite side, said selvedge forming means comprising bobbin means for holding and feeding selvedge thread, said bobbin means being mounted on said support means for oscillation about an axis substantially parallel to the direction of movement of said weft inserting means between a position below the warp and a position above the warp for inserting the selvedge thread into the loops formed by said weft inserting means, said bobbin means comprising a thread holding and feeding bobbin member and a supporting member mounted for oscillation about said axis and having a gear sector portion; sley means operable by the loom driving means to beat the weft inserted by said weft inserting means; connecting means connecting said sley means to said weft inserting means for operating said weft inserting means in synchronism with the movements of said sley means; and actuating means connected to said selvedge forming means and operable by the loom driving means for moving said selvedge forming means relative to the warp in a direction substantially normal to the direction of movement of said weft inserting means and in synchronism with the movements of said weft inserting means and said sley means, said actuating means including spaced gear means operatively engaging said gear sector portion of said bobbin means for oscillating the same, said weft inserting means being adapted to freely move between said spaced gear means.

4. In a weaving apparatus including a loom and driving means therefor, in combination, support means; weft inserting means mounted on said support means and arranged on one side of the warp for movement through the warp shed and across the warp and back for laying loops of weft thread in the shed; selvedge forming means mounted on said support means and arranged on the opposite side of the warp and operable to insert a selvedge thread through the weft loops formed by said weft inserting means along the warp for forming a selvedge along the woven material on said opposite side, said selvedge forming means comprising bobbin means for holding and feeding selvedge thread, said bobbin means being mounted on said support means for oscillation about an axis substantially parallel to the direction of movement of said weft inserting means between a position below the warp and a position above the warp for inserting the selvedge thread into the loops formed by said weft inserting means, said bobbin means comprising a thread holding and feeding bobbin member and a supporting member mounted for oscillation about said axis and having a gear sector portion; sley means operable by the loom driving means to beat the weft inserted by said weft inserting means; connecting means connecting said sley means to said weft inserting means for operating said weft inserting means in synchronism with the movements of said sley means; and actuating means connected to said selvedge forming means and operable by the loom driving means for moving said selvedge forming means relative to the warp in a direction substantially normal to the direction of movement of said weft inserting means and in synchronism with the movements of said weft inserting means and said sley means, said actuating means including spaced gear means operatively engaging said gear sector portion of said bobbin means for oscillating the same, said weft inserting means being adapted to freely move between said spaced gear means, said gear means including a first pair of pinion gears spaced respectively above and below the path of movement of said weft inserting means and adapted to selectively operatively engage said gear sector portion of said bobbin means, and a second pair of pinion gears connected respectively coaxially with said first pair of pinion gears, said actuating means also comprising a toothed gear sector operatively engaging both of said second pair of pinion gears, and pivoted lever and cam means connecting said toothed gear sector to the loom driving means for operation thereby in synchronism with said weft inserting means and said sley means.

5. A device as defined in claim 4, wherein said toothed gear sector and said gear sector portion of said bobbin means are mounted for turning about different parallel axes.

6. A device as defined in claim 4, wherein said toothed gear sector and said gear sector portion of said bobbin means are mounted for turning about the same axis.

7. In a weaving apparatus including a loom and driving means therefor, in combination, support means; weft inserting means mounted on said support means and arranged on one side of the warp for movement through the warp shed and across the warp and back for laying loops of weft thread in the shed; selvedge forming means mounted on said support means and arranged on the opposite side of the warp and operable to insert a selvedge thread through the weft loops formed by said weft inserting means along the warp for forming a selvedge along the woven material on said opposite side, said selvedge forming means comprising bobbin means for holding and feeding selvedge thread, said bobbin means being mounted on said support means for reciprocation normal to the direction of movement of said weft inserting means between a position below the warp and a position above the warp for inserting the selvedge thread into the loops formed by said weft inserting means, said bobbin means comprising a thread holding and feeding bobbin member and a reciprocable supporting member carrying said bobbin member and having a gear rack portion; sley means operable by the loom driving means to beat the weft inserted by said weft inserting means; connecting means connecting said sley means to said weft inserting means for operating said weft inserting means in synchronism with the movements of said sley means; and actuating means connected to said selvedge forming means and operable by the loom driving means for moving said selvedge forming means relative to the warp in a direction substantially normal to the direction of movement of said weft inserting means and in synchronism with the movements of said weft inserting means and said sley means, said actuating means including spaced gear means operatively engaging said gear rack portion of said bobbin means for reciprocating the same, said weft inserting means being adapted to freely move between said spaced gear means.

8. In a weaving apparatus including a loom and driving means therefor, in combination, support means; weft inserting means mounted on said support means and arranged on one side of the warp for movement through the warp shed and across the warp and back for laying loops of weft thread in the shed; selvedge forming means mounted on said support means and arranged on the opposite side of the warp and operable to insert a selvedge thread through the weft loops formed by said weft inserting means along the warp for forming a selvedge along the woven material on said opposite side, said selvedge forming means comprising bobbin means for holding and feeding selvedge thread, said bobbin means being mounted on said support means for turning about an axis substantially parallel to the direction of movement of said weft inserting means between a position below the warp and a position above the warp for inserting the selvedge thread into the loops formed by said weft inserting means, said bobbin means comprising a thread holding and feeding bobbin member and a supporting member mounted for turning about said axis and having a gear sector portion; sley means operable by the loom driving means to beat the weft inserted by said weft inserting means; connecting means connecting said sley means to said weft inserting means for operating said weft inserting means in synchronism with the movements of said sley means; and actuating means connected to said selvedge forming means and operable by the loom driving means for moving said selvedge forming means relative to the warp in a direction substantially normal to the direction of movement of said weft inserting means and in synchronism with the movements of said weft inserting means and said sley means, said actuating means including a first main gear driven by the loom driving means, a pair of pinion gears driven by said first main gear, a second main gear driven by said pair of pinion gears, a plurality of auxiliary pinion gears driven by said second main gear, and counterpinion gears mounted respectively coaxial with said pair of pinion gears and said auxiliary pinion gears, said gear sector portion of said bobbin means being mounted coaxial with said second main gear and being operatively engaged by said counterpinion gears for continuous rotation thereby about said axis.

9. A device as defined in claim 8, and including guiding means on said bobbin supporting member for feeding the selvedge thread therefrom substantially at the axis of rotation of said second main gear.

10. A device as defined in claim 1, wherein said weft inserting means is provided with a flexible braking means for tensioning the weft thread being inserted by said weft inserting means.

11. A device as defined in claim 10, wherein adjusting means are provided for regulating the tension produced on the weft thread by said braking means.

12. A device as defined in claim 1, wherein braking means are provided through which the weft thread is adapted to pass before entering the weft inserting means, and adjustable weft thread engaging means are mounted on said sley means for varying the amount of weft thread drawn through said braking means.

13. A device as defined in claim 2, wherein said bobbin means includes a supporting member and a bobbin member rotatably mounted on said supporting member, and wherein adjustable retarding means are provided for braking the rotation of said bobbin member.

14. A device as defined in claim 13, wherein said adjustable retarding means comprises an expandable hollow pivot member on which said bobbin member is rotatable, and screw means adjustably movable within said hollow pivot member for variably expanding said pivot member.

15. A device as defined in claim 1, wherein the means connecting said sley means with said weft inserting means includes an arm member connected to said weft inserting means, a sleeve member slidable on said arm member, and a rod member connected at one end to said sley means and at its other end to said sleeve member, said connecting means providing for sinusoidal variation of the speed of movement of said weft inserting means.

16. A device as defined in claim 1, wherein the means connecting said sley means with said weft inserting means includes a rod member hingedly connected at one end to said sley means, an arm member connected to said weft inserting means, a sleeve member slidable on said arm member and connected to the other end of said rod member, and elongated guide means mounted on said support means, said sleeve member being reciprocable within said elongated guide means.

17. A device as defined in claim 1, wherein the means connecting said sley means with said weft inserting means includes a pinion gear connected to said weft inserting means, and a rack means connected at one end to said sley means and engaging said pinion gear on said weft inserting means.

References Cited in the file of this patent

UNITED STATES PATENTS

| | | |
|---|---|---|
| 653,274 | Weaver | July 10, 1900 |
| 839,315 | Pearsall | Dec. 25, 1906 |
| 1,391,958 | Kendrick | Sept. 27, 1921 |
| 1,797,962 | Merrick | Mar. 24, 1931 |
| 2,112,912 | Kennary | Apr. 5, 1938 |
| 2,294,325 | Williamson | Aug. 25, 1942 |
| 2,354,615 | Robb | July 25, 1944 |
| 2,552,317 | Hart | May 8, 1951 |

FOREIGN PATENTS

| | | |
|---|---|---|
| 3,025 | Germany | Jan. 1, 1878 |
| 540,161 | Great Britain | Oct. 7, 1941 |